(12) United States Patent
Li

(10) Patent No.: US 8,531,777 B2
(45) Date of Patent: Sep. 10, 2013

(54) ZOOM LENS

(75) Inventor: Dayong Li, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 91 days.

(21) Appl. No.: 13/182,764

(22) Filed: Jul. 14, 2011

(65) Prior Publication Data

US 2012/0063003 A1 Mar. 15, 2012

(30) Foreign Application Priority Data

Sep. 10, 2010 (JP) ................................ 2010-203702

(51) Int. Cl.
*G02B 15/14* (2006.01)

(52) U.S. Cl.
USPC ....................................................... 359/687

(58) Field of Classification Search
USPC ......................................... 359/676, 686, 687
See application file for complete search history.

(56) References Cited

U.S. PATENT DOCUMENTS

| | | | |
|---|---|---|---|
| 5,600,490 A * | 2/1997 | Sugawara et al. ............. | 359/690 |
| 6,646,804 B2 | 11/2003 | Harada | |
| 2003/0133200 A1 | 7/2003 | Sato | |
| 2010/0321792 A1* | 12/2010 | Yamagami .................... | 359/687 |
| 2011/0228407 A1* | 9/2011 | Yamaguchi ................... | 359/687 |

FOREIGN PATENT DOCUMENTS

| | | |
|---|---|---|
| JP | 2002-162564 A | 6/2002 |
| JP | 2003-344766 A | 12/2003 |
| JP | 2010-44372 A | 2/2010 |

\* cited by examiner

*Primary Examiner* — Darryl J Collins
(74) *Attorney, Agent, or Firm* — Foley & Lardner LLP

(57) ABSTRACT

A zoom lens includes, sequentially from an object side, a first lens group having a positive refractive power; a second lens group having negative refractive power; a third lens group having a positive refractive power; and a fourth lens group having a positive refractive power. The third lens group includes, sequentially from the object side, a front group having a positive refractive power and a rear group having a negative refractive power. Zoom is performed by moving the second lens group and the third lens group in a direction along an optical axis, and by integrally moving the front group and the rear group in a direction along the optical axis. Focusing is preformed by moving the front group in a direction along the optical axis.

13 Claims, 8 Drawing Sheets

ZOOM LENS

BACKGROUND OF THE INVENTION

1. Field of the Invention

The present invention relates to a zoom lens ideal for digital still and motion cameras (DSMC), single-lens reflex cameras, and the like.

2. Description of the Related Art

Recently, in DSMCs and single-lens reflex cameras, zoom lenses are used in which a portion of the lenses in the first group are moved along the optical axis during focusing (see, for example, Japanese Patent Application Laid-Open Publication Nos. 2002-162564 and 2003-344766). Zoom lenses are also used in which a third or a fourth group configured by plural intermediate diameter lenses is moved along the optical axis during focusing (see, for example, Japanese Patent Application Laid-Open Publication No. 2010-44372).

For example, the zoom lens recited in Japanese Patent Application Laid-Open Publication No. 2002-162564 has, sequentially from an object side, a front lens component that includes plural lenses for performing zoom and focusing; and a rear lens component that includes a relay lens group having an imaging function. The rear lens component has, sequentially from the object side, a lens group A having a positive refractive power, a lens group B having a negative refractive power and movable so as to have a component in a direction orthogonal to the optical axis, and a lens group C having a positive refractive power, where the movement of the lens group B so as to have a component in a direction orthogonal to the optical axis causes displacement of the image.

The zoom lens recited in Japanese Patent Application Laid-Open Publication No. 2003-344766 includes, sequentially from the object side, a positive first lens group, a negative second lens group, a positive third lens group, and a positive fourth lens group, where the second lens group and the third lens group are moved in a direction along the optical axis to perform zooming. The first lens group is configured sequentially by a positive front group and a rear group having a stronger refractive power than the front group, where the rear group is moved in a direction along the optical axis to perform near focus and the front group is configured sequentially by a negative meniscus lens having a convex surface facing toward the object side, a positive lens whose object-side surface is convex, and a positive lens whose object-side surface is convex. The rear group is configured sequentially by a negative meniscus lens having a convex surface facing toward the object side, and a positive lens component.

The zoom lens recited in Japanese Patent Application Laid-Open Publication No. 2010-44372 has a first lens group having a positive refractive power and disposed farthest on the object side, a second lens group disposed on the image plane side of the first lens group, a $G_n$ lens group disposed farthest on the image plane side, a $G_{n-1}$ lens group disposed on the object side of the $G_n$ lens group, and at least 1 lens group disposed between the second lens group and the $G_{n-1}$ lens group. When zoom is performed, the first lens group and the $G_n$ lens group are fixed. When focusing is performed, at least 1 lens group disposed between the second lens group and the $G_{n-1}$ lens group is moved and at least a portion of the $G_n$ lens group is moved so as to have a component in a direction substantially orthogonal to the optical axis.

Nonetheless, the zoom lenses disclosed in Japanese Patent Application Laid-Open Publication Nos. 2002-162564 and 2003-344766 perform focusing by extending the first group that controls focusing and in which plural large diameter lenses are used. As a result, the first group is heavy and the effective diameter thereof is large, arising in problems of slow focusing speed and large power consumption by the drive apparatus driving the lens group.

Further, the zoom lens disclosed in Japanese Patent Application Laid-Open Publication No. 2010-44372 performs focusing by extending the third or the fourth group and although the third or the fourth group controlling focusing has an intermediate effective diameter, each is configured by intermediate diameter lenses and therefore, it is difficult to say that weight reduction is sufficiently facilitated. Consequently, if zoom and focusing are performed simultaneously, load is placed on the drive apparatus driving the lens group and it is difficult to perform quick zooming and focusing. Additionally, since this zoom lens has an absolute lateral magnification of 5 or less for the focusing group, the distance that the focusing group is extended for focusing from an infinity focus state to a near focus state becomes large, whereby the driving time for focusing increases and the quick capture of an image is difficult.

SUMMARY OF THE INVENTION

It is an object of the present invention to at least solve the above problems in the conventional technologies.

A zoom lens according to one aspect of the present invention includes, sequentially from an object side, a first lens group having a positive refractive power; a second lens group having negative refractive power; a third lens group having a positive refractive power; and a fourth lens group having a positive refractive power. The third lens group includes, sequentially from the object side, a front group having a positive refractive power and a rear group having a negative refractive power. Zoom is performed by moving the second lens group and the third lens group in a direction along an optical axis, and by integrally moving the front group and the rear group in a direction along the optical axis. Focusing is preformed by moving the front group in a direction along the optical axis.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
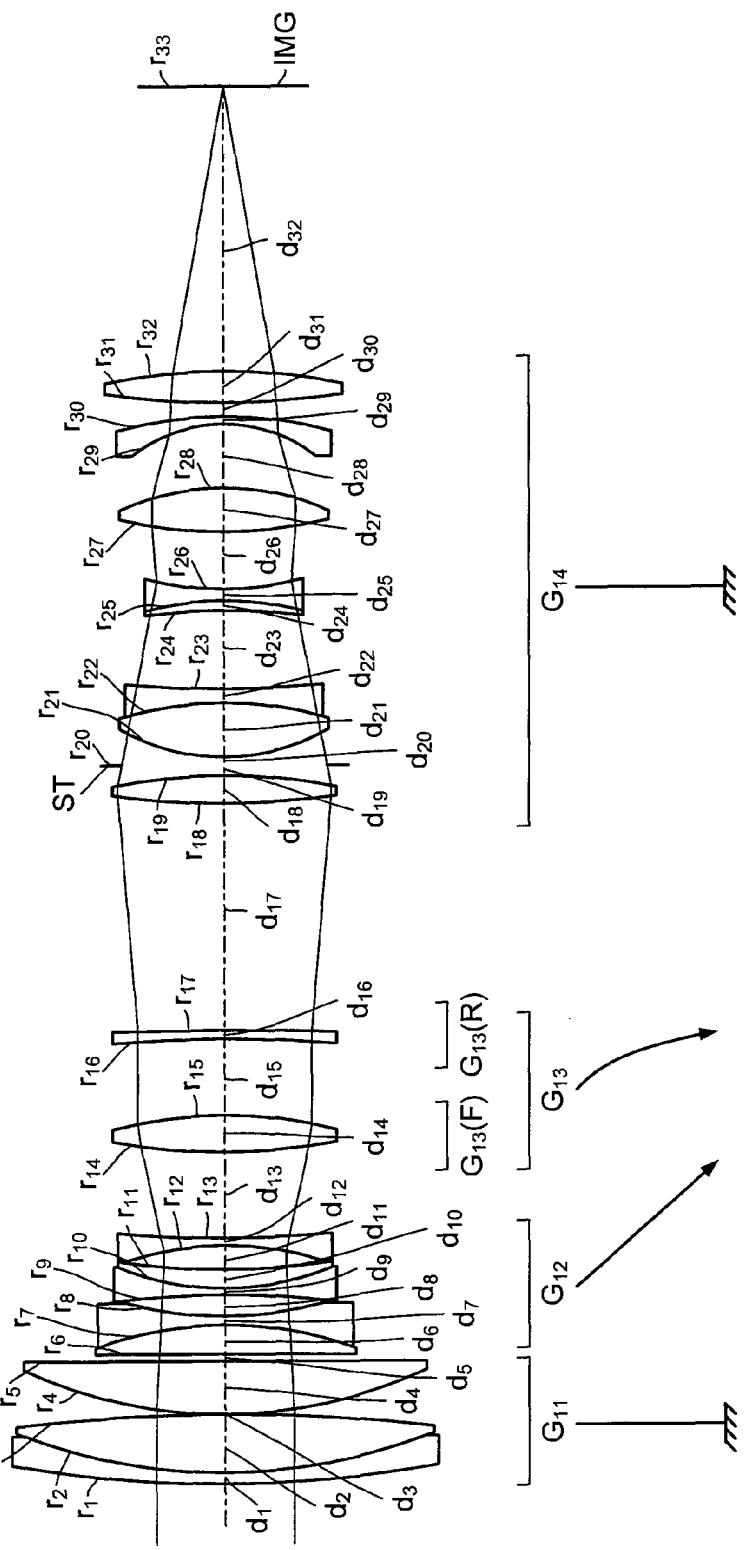
FIG. 1 depicts a cross-sectional view (along the optical axis) of a zoom lens according to a first embodiment.

Referring to the accompanying drawings, exemplary embodiments according to the present invention are explained in detail below.

A zoom lens according to the present invention includes, sequentially from an object side, a first lens group having a positive refractive power, a second lens group having a negative refractive power, a third lens group having a positive refractive power, and fourth lens group having a positive refractive power.

An object of the invention is to provide a zoom lens that has high optical performance and is capable of capturing images quickly by achieving a compact, light-weight focusing group and suppressing the distance that the focusing group is extended for focusing. To achieve this object, various conditions are set as indicated below.

The third lens group includes, sequentially from the object side, a front group having a positive refractive power, and a rear group having a negative refractive power. The zoom lens zooms from a wide angle edge to a telephoto edge by uniformly moving the second lens group and the third lens group along the optical axis, from the object side toward the image side. During this movement, the front group and the rear group constituting the third lens group are moved as a unit along the optical axis. Further, the first lens group and the fourth lens group are fixed. Focusing is performed by moving the front group alone, along the optical axis.

In the invention, a portion of the lens group controlling zoom is used as a focusing group. Consequently, compared to conventional zoom lenses, reductions in the size and weight of the focusing group can be facilitated. As a result, quick focusing becomes possible. Preferably, the front group of the third lens group controlling focusing is configured by 1 positive lens. Such configuration enables further reductions in the size and weight of the focusing group, and quicker focusing.

The front group of the third lens group of the zoom lens according to the present invention is preferably configured by an aspheric lens that satisfies the following conditional expression.

$$0.1 < |100 \times (\Delta S1 - \Delta S2)/\phi S| < 0.5 \quad (1)$$

Where, $\Delta S1$ represents the deviation of the paraxial radius of curvature at the height of the effective diameter of the aspheric surface on the object side of the front group and aspheric surface shape, $\Delta S2$ represents the deviation of the paraxial radius of curvature at the height of the effective diameter of the aspheric surface on the image side of the front group and aspheric surface shape, and $\phi S$ represents the effective diameter of the front group.

Conditional expression (1) prescribes a condition for improving the optical performance of the focusing group. Below the lower limit of conditional expression (1), in a near focus state, the correction of field curvature occurring at the front group of the third lens group becomes difficult. On the other hand, above the upper limit of conditional expression (1), in an infinity focus state, the correction of field curvature occurring at the front group of the third lens group becomes difficult.

More favorable results can be expected if conditional expression (1) is satisfied within the following range.

$$0.25 < |100 \times (\Delta S1 - \Delta S2)/\phi S| < 0.4 \quad (1)'$$

By satisfying the range prescribed by conditional expression (1)', the optical performance of the front group (focusing group) of the third lens group can be further improved.

Further, the zoom lens preferably satisfies the following conditional expression, where F3F is the focal length of the front group of the third lens group and F3 is the focal length of the entire third lens group in the infinity focus state.

$$0.5 < F3F/F3 < 0.95 \quad (2)$$

Conditional expression (2) prescribes a condition to favorably correct various types of aberration throughout the entire zoom range, from an infinity focus state to a near focus state. Below the lower limit of conditional expression (2), an imbalance of refractive power between the front group and the rear group of the third lens group occurs. As a result, although the correction of various types of aberration in the infinity focus state is favorable, the correction of the various types of aberration in the near focus state becomes difficult. On the other hand, above the upper limit of conditional expression (2), the refractive power of the third lens group (reciprocal of focal length) becomes too weak. As a result, although aberration variation from the infinity focus state to the near focus state becomes small, the correction of various types of aberration in the infinity focus state becomes difficult.

More favorable results can be expected if conditional expression (2) is satisfied within the following range.

$$0.75 < F3F/F3 < 0.85 \quad (2)'$$

By satisfying the range prescribed by conditional expression (2)', various types of aberration can corrected more favorably.

The zoom lens according to the invention preferably satisfies the following conditional expression, where $\beta FT$ is the lateral magnification of the front group of the third lens in the infinity focus state at the telephoto edge.

$$5 < |\beta FT| \quad (3)$$

Conditional expression (3) prescribes a condition to both suppress the distance that the focusing group is extended to perform focusing (displacement) and to achieve favorable correction of various types of aberration. If conditional expression (3) is not satisfied, problems arise in that the distance that the focusing group is extended increases, or the correction of various types of aberration becomes difficult. For example, if the value $\beta FT$ is $0 < \beta FT < 5$, the refractive power of the front group of the third lens group becomes to weak and although the correction of chromatic aberration in the near focus state is favorable, the distance that the focusing group is extended for focusing in the near focus state becomes large, impeding size reductions of the optical system. On the other hand, if the value of $\beta FT$ is $-5 < \beta FT < 0$, the refractive power of the front group of the third lens group becomes too strong and although the distance that the focusing group is extended for focusing in the near focus state can be suppressed, the correction of various types of aberration in the infinity focus state and in the near focus state becomes difficult. In particular, if the front group is configured by 1 lens, the correction of various types of aberration becomes difficult.

More favorable results can be expected if conditional expression (3) is satisfied within the following range.

$$15 < |\beta FT| \quad (3)'$$

By satisfying the range prescribed by conditional expression (3)', the distance that the focusing group is extended for focusing is suppressed while more favorable aberration correction is realized.

As described, in the zoom lens according to the invention, rather than the first lens group, a portion of the third lens group having a small diameter is used as the focusing group, whereby compared to conventional zoom lenses, reductions in the size and weight of the focusing group are achieved. Additionally, since the focusing group is constituted by 1 lens, significant size and weight reductions of the focusing group are achieved. Furthermore, by adopting, as the lens constituting the focusing group, an aspheric lens that satisfies conditional expression (1), field curvature can be favorably corrected throughout the entire zoom range, from the infinity focus state to the near focus state. By satisfying conditional expression (2), various types of aberration can be favorably corrected throughout the entire zoom range, from the infinity focus state to the near focus state. By satisfying conditional expression (3), the distance that the focusing group is extended for focusing can be suppressed, without deterioration in optical performance.

Thus, according to the zoom lens of the invention, reductions in the size and weight of the focusing group as well as suppression of the distance that focusing group is extended for focusing become possible, whereby focusing can be performed quickly. Therefore, images can be captured quickly. Furthermore, the suppression of the distance that focusing group is extended for focusing promotes the shortening of the overall length of the optical system, without deteriorations in optical performance.

FIG. 1 depicts a cross-sectional view (along the optical axis) of the zoom lens according to a first embodiment. The zoom lens includes sequentially from an object side (object not depicted), a first lens group $G_{11}$ having a positive refractive power, a second lens group $G_{12}$ having a negative refractive power, a third lens group $G_{13}$ having a positive refractive power, and a fourth lens group $G_{14}$ having a positive refractive power. Further, the third lens group $G_{13}$ includes, sequentially from the object side, a front group $G_{13}(F)$ having a positive refractive power and a rear group $G_{13}(R)$ having a negative refractive power. Both surfaces of the front group $G_{13}(F)$ are formed to be aspheric. Further, in the fourth lens group $G_{14}$, an aperture stop ST that regulates a given aperture is disposed. At an imaging plane IMG, the light receiving surface of an imaging element, such as a CCD and a CMOS, is disposed.

In the zoom lens, the second lens group $G_{12}$ and the third lens group $G_{13}$ are moved integrally along the optical axis, from the object side to the imaging plane IMG side, to zoom from a wide angle edge to a telephoto edge. During this movement, the front group $G_{13}(F)$ and the rear group $G_{13}(R)$ are moved integrally along the optical axis. Furthermore, the first lens group $G_{11}$ and the fourth lens group $G_{14}$ do not move. The front group $G_{13}(F)$ alone is moved in a direction along the optical axis to perform focusing.

Various values related to the zoom lens according to the first embodiment are indicated below.
Focal length of entire zoom lens (mm)=71.5336 (wide angle edge) to 111.5353 (intermediate position) to 194.0928 (telephoto edge)
Focal length of first lens group $G_{11}$ (mm)=144.469
Focal length of second lens group $G_{12}$ (mm)=−33.664
Focal length of third lens group $G_{13}$ (mm)=90.870 (=F3)
Focal length of fourth lens group $G_{14}$ (mm)=82.798
F number=2.9 (wide angle edge) to 2.9 (intermediate position) to 2.9 (telephoto edge)
Angle of view (2ω)=34.66° (wide angle edge) to 20.71° (intermediate position) to 12.48° (telephoto edge)
Zoom ratio=2.713
(Values Related to Conditional Expression (1))
Deviation of paraxial radius of curvature at height of effective diameter of aspheric surface on object side of front group $G_{13}(F)$ and aspheric surface shape ($\Delta S1$)=−0.0453
Deviation of paraxial radius of curvature at height of effective diameter of aspheric surface on image side of front group $G_{13}(F)$ and aspheric shape ($\Delta S2$)=0.0662
Effective diameter of front group $G_{13}(F)$ (($\phi S$)=36.9

$|100 \times (\Delta S1 - \Delta S2)/\phi S| = 0.302$ (Values Related to Conditional Expression (2))
Focal length of front group $G_{13}(F)$ of third lens group $G_{13}$ (F3F)(mm)=72.385
F3F/F3=0.7966
(Values Related to Conditional Expression (3))

$|\beta FT| = 31.838$ (Where, βFT is lateral magnification of front group $G_{13}(F)$ of third lens group $G_{13}$ in infinity focus state, at telephoto edge)
$r_1$=222.8728
   $d_1$=2.0000 $nd_1$=1.91082 $\upsilon d_1$=35.25
$r_2$=103.7846
   $d_2$=10.5000 $nd_2$=1.45860 $\upsilon d_2$=90.19
$r_3$=−300.7820
   $d_3$=0.2000
$r_4$=88.4625
   $d_4$=9.0000 $nd_3$=1.49700 $\upsilon d_3$=81.61
$r_5$=−9494.4089
   $d_5$=1.3857 (wide angle edge) to 31.7756 (intermediate position) to 54.1401 (telephoto edge)
$r_6$=1908.7598
   $d_5$=5.2000 $nd_4$=1.90366 $\upsilon d_4$=31.31
$r_7$=−69.4016
   $d_7$=1.3500 $nd_5$=1.61800 $\upsilon d_5$=63.39
$r_8$=69.4016
   $d_8$=3.8890
$r_9$=−141.8243
   $d_9$=1.2000 $nd_6$=1.49700 $\upsilon d_6$=81.61
$r_{10}$=52.9228
   $d_{10}$=3.3000 $nd_7$=1.84666 $\upsilon d_7$=23.78
$r_{11}$=111.5902
   $d_n$=4.4169
$r_{12}$=−60.5428
   $d_{12}$=1.2000 $nd_8$=1.88300 $\upsilon d_8$=40.80
$r_{13}$=174.6335
   $d_{13}$=15.4455 (wide angle edge) to 11.6391 (intermediate position) to 1.6000 (telephoto edge)
$r_{14}$=113.7835 (aspheric surface) (effective diameter $\phi S$=36.9)
   $d_{14}$=6.3000 $nd_9$=1.58313 $\upsilon d_9$=59.46
$r_{15}$=−65.7348 (aspheric surface)
   $d_{15}$=13.7091
$r_{16}$=−163.7249
   $d_{16}$=1.4000 $nd_{10}$=1.92286 $\upsilon d_{10}$=20.88
$r_{17}$=−439.7863
   $d_{17}$=40.4088 (wide angle edge) to 13.8254 (intermediate position) to 1.5000 (telephoto edge)
$r_{18}$=125.0060
   $d_{18}$=5.1184 $nd_{11}$=1.61800 $\upsilon d_{11}$=63.39
$r_{19}$=−95.7349
   $d_{19}$=1.7000
$r_{20}$=∞ (aperture stop)
   $d_{20}$=1.7000
$r_{21}$=37.0745
   $d_{21}$=9.5000 $nd_{12}$=1.49700 $\upsilon d_{12}$=81.61
$r_{22}$=−65.1203
   $d_{22}$=2.5000 $nd_{13}$=1.71736 $\upsilon d_{13}$=29.50
$r_{23}$=105.7968
   $d_{23}$=14.2949
$r_{24}$=88.9484
   $d_{24}$=2.3000 $nd_{14}$=1.80809 $\upsilon d_{14}$=22.76

$r_{25}=-39.7920$
    $d_{25}=1.4000$ $nd_{15}=1.69350$ $\upsilon d_{15}=53.20$
$r_{26}=41.7941$ (aspheric surface)
    $d_{26}=10.5167$
$r_{27}=80.4222$
    $d_{27}=7.5000$ $nd_{16}=1.61800$ $\upsilon d_{16}=63.39$
$r_{28}=-44.5394$
    $d_{28}=11.5916$
$r_{29}=-28.1673$
    $d_{29}=1.5000$ $nd_{17}=1.71300$ $\upsilon d_{17}=53.94$
$r_{30}=-64.7347$
    $d_{30}=2.5887$
$r_{31}=140.8610$
    $d_{31}=5.5000$ $nd_{18}=1.56883$ $\upsilon d_{18}=56.04$
$r_{32}=-92.8595$
    $d_{32}=51.37$
$r_{33}=\infty$ (imaging plane)
Constant of Cone (K) and Aspheric Coefficients (A, B, C, D, E, F)
(Fourteenth Plane)
K=−11.9954,
A=0, B=2.66677×10$^{-7}$,
C=1.55243×10$^{-9}$, D=−2.91159×10$^{-12}$,
E=2.12840×10$^{-16}$, F=3.53783×10$^{-18}$
(Fifteenth Plane)
K=−0.5492,
A=0, B=1.02602×10$^{-8}$,
C=1.30471×10$^{-9}$, D=−6.07503×10$^{-13}$,
E=−3.7893×10$^{-15}$, F=5.96719×10$^{-18}$
(Twenty-Sixth Plane)
K=−1.4774,
A=0, B=−1.17887×10$^{-6}$,
C=−1.07533×10$^{-9}$, D=−3.90498×10$^{-12}$,
E=8.54852×10$^{-35}$, F=0

Figure 2:
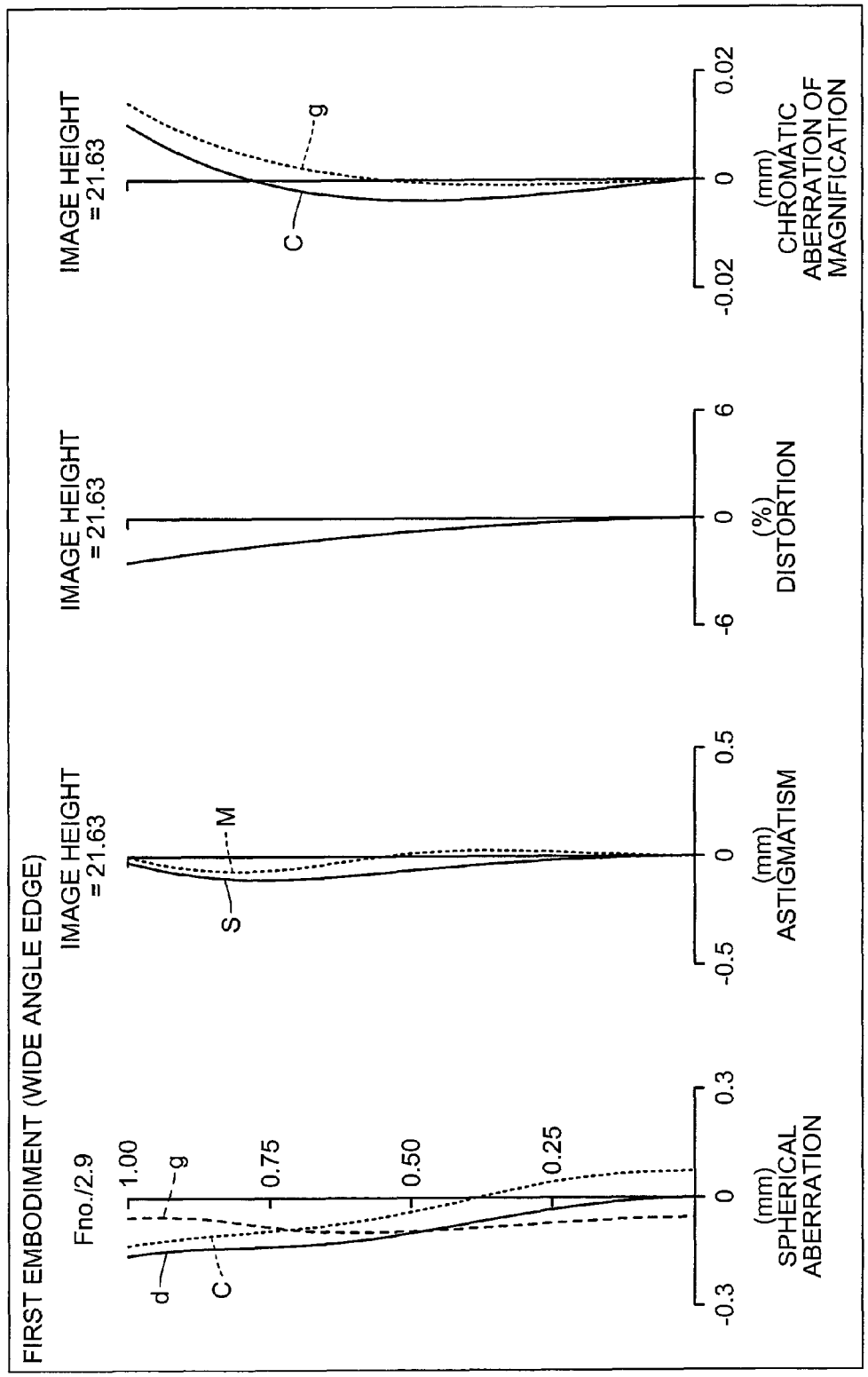
FIG. 2 is a diagram of various types of aberration at a wide angle edge of the zoom lens of the first embodiment according to the invention.
Figure 3:
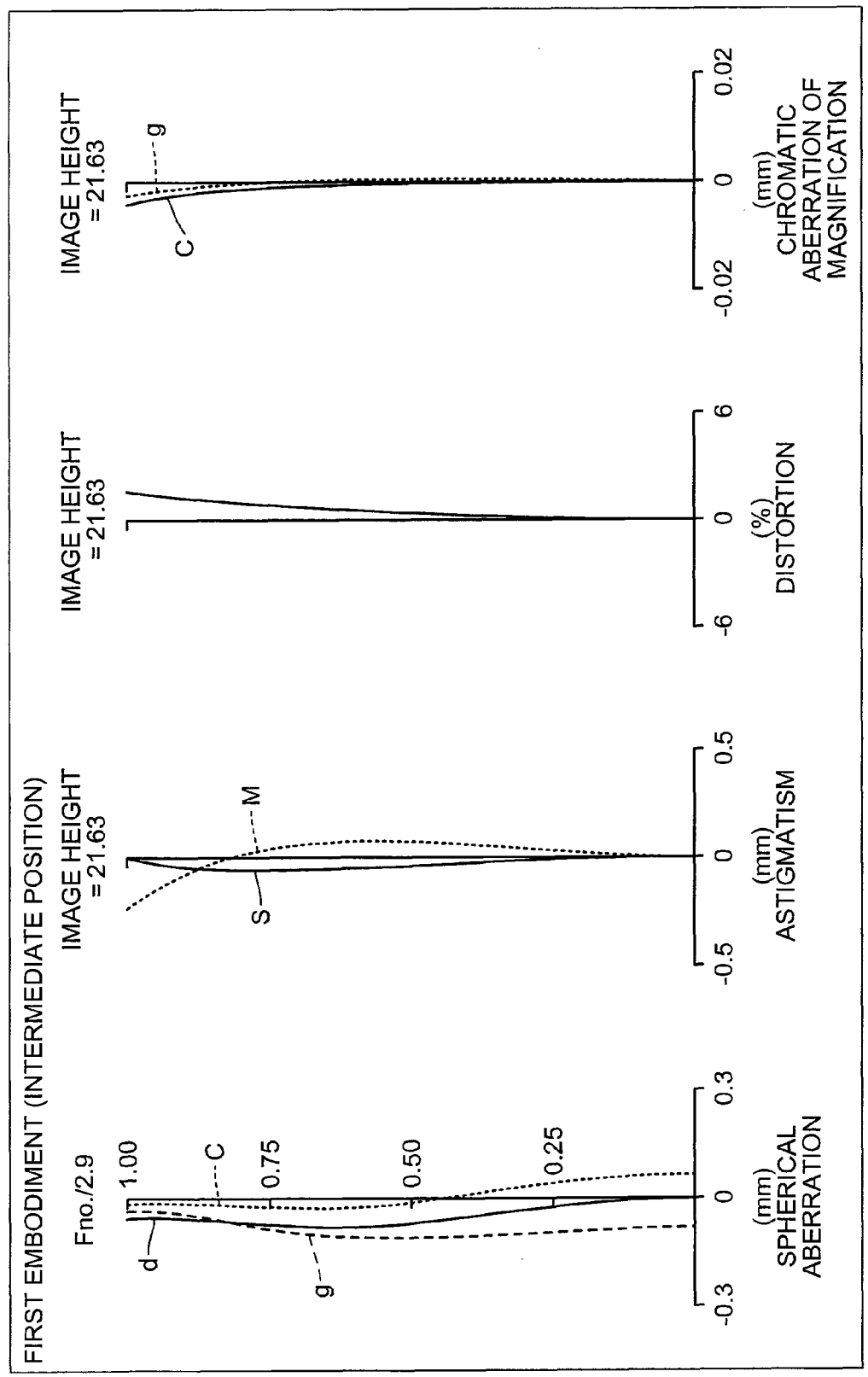
FIG. 3 is a diagram of various types of aberration at an intermediate position of the zoom lens of the first embodiment according to the invention.
Figure 4:
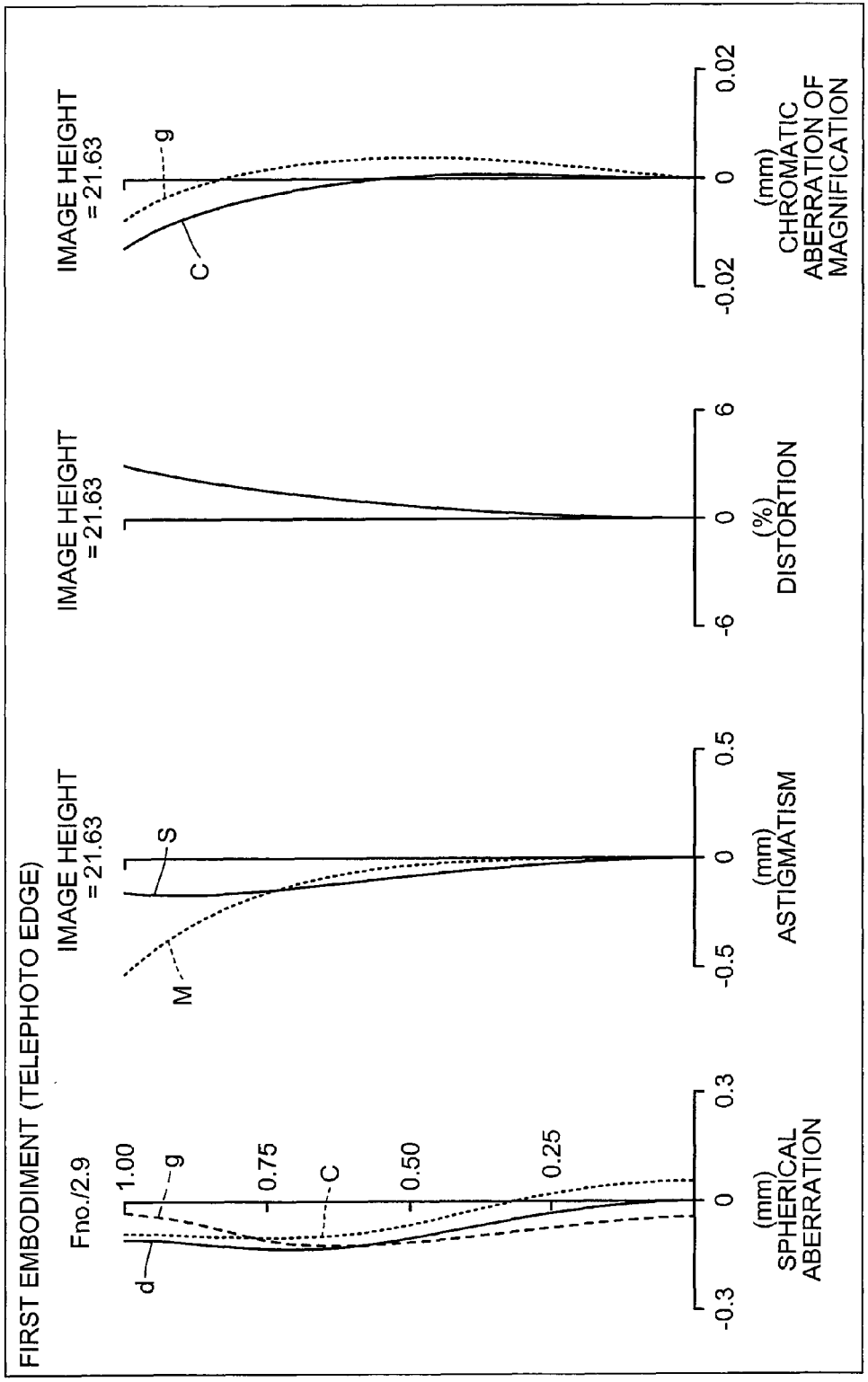
FIG. 4 is a diagram of various types of aberration at a telephoto edge of the zoom lens of the first embodiment according to the invention.

FIG. 2 is a diagram of various types of aberration at the wide angle edge of the zoom lens of the first embodiment according to the invention; FIG. 3 is a diagram of various types of aberration at the intermediate position of the zoom lens of the first embodiment according to the invention; and FIG. 4 is a diagram of various types of aberration at the telephoto edge of the zoom lens of the first embodiment according to the invention. In the diagrams, g, d, and C represent wavelength aberration corresponding to the g-line ($\lambda$=435.83 nm), the d-line ($\lambda$=587.56 nm), and the c-line ($\lambda$=656.27 nm), respectively; and $\Delta S$ and $\Delta M$ in a portion depicting astigmatism, indicate aberration with respect to a sagittal image plane and a meridional image plane, respectively.

Figure 5:
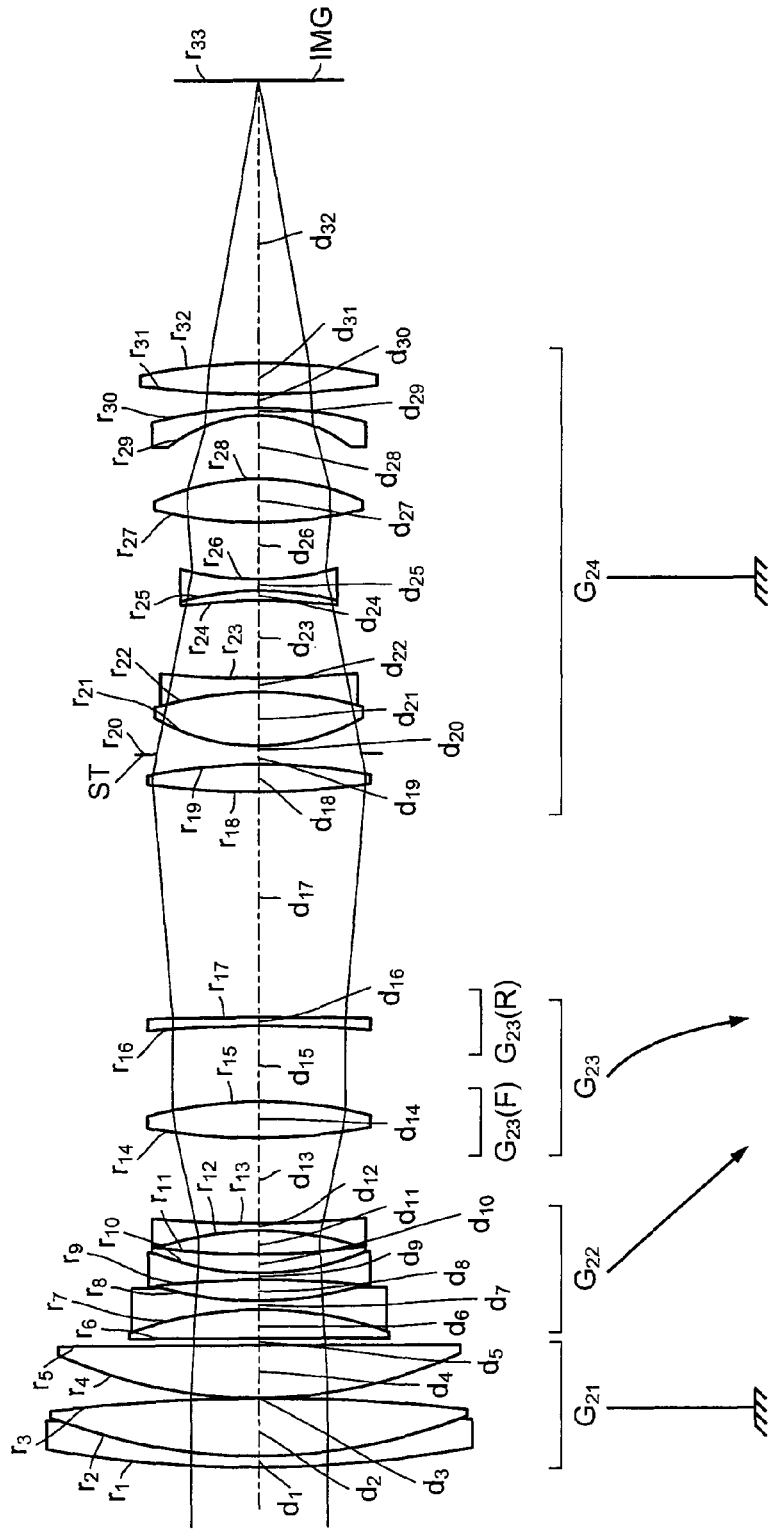
FIG. 5 depicts a cross-sectional view (along the optical axis) of the zoom lens according to a second embodiment.

FIG. 5 depicts a cross-sectional view (along the optical axis) of the zoom lens according to a second embodiment. The zoom lens includes, sequentially from an object side (object not depicted), a first lens group $G_{21}$ having a positive refractive power, a second lens group $G_{22}$ having a negative refractive power, a third lens group $G_{23}$ having a positive refractive power, and a fourth lens group $G_{24}$ having a positive refractive power. Further, the third lens group $G_{23}$ includes, sequentially from the object side, front group $G_{23}(F)$ having a positive refractive power and rear group $G_{23}(R)$ having a negative refractive power. Both surfaces of the front group $G_{23}(F)$ are formed to be aspheric. Further, in the fourth lens group $G_{24}$, the aperture stop ST that regulates a given aperture is disposed. At the imaging plane IMG, the light receiving surface of an imaging element, such as a CCD and a CMOS, is disposed.

In the zoom lens, the second lens group $G_{22}$ and the third lens group $G_{23}$ are moved integrally along the optical axis, from the object side to the imaging plane IMG side, to zoom from a wide angle edge to a telephoto edge. During this movement, the front group $G_{23}(F)$ and the rear group $G_{23}(R)$ are moved integrally along the optical axis. Furthermore, the first lens group $G_{21}$ and the fourth lens group $G_{24}$ do not move. The front group $G_{23}(F)$ alone is moved in a direction along the optical axis to perform focusing.

Various values related to the zoom lens according to the second embodiment are indicated below.
Focal length of entire zoom lens (mm)=71.5209 (wide angle edge) to 117.5105 (intermediate position) to 194.0681 (telephoto edge)
Focal length of first lens group $G_{21}$ (mm)=144.087
Focal length of second lens group $G_{22}$ (mm)=−33.304
Focal length of third lens group $G_{23}$ (mm)=90.526(=F3)
Focal length of fourth lens group $G_{24}$ (mm)=82.744
F number=2.9 (wide angle edge) to 2.9 (intermediate position) to 2.9 (telephoto edge)
Angle of view (2ω)=34.66° (wide angle edge) to 20.71° (intermediate position) to 12.48° (telephoto edge)
Zoom ratio=2.713
(Values Related to Conditional Expression (1))
Deviation of paraxial radius of curvature at height of effective diameter of aspheric surface on object side of front group $G_{23}(F)$ and aspheric surface shape ($\Delta S1$)=−0.069
Deviation of paraxial radius of curvature at height of effective diameter of aspheric surface on image side of front group $G_{23}(F)$ and aspheric shape ($\Delta S2$)=0.0722
Effective diameter of front group $G_{23}(F)$ (($\phi S$)=37.0

$|100\times(\Delta S1-\Delta S2)/(\phi S)|=0.3827$ (Values Related to Conditional Expression (2))
Focal length of front group $G_{23}(F)$ of third lens group $G_{23}$ (F3F)(mm)=74.084
F3F/F3=0.8184
(Values Related to Conditional Expression (3))

$|\beta FT|=15.232$ (Where, $\beta FT$ is lateral magnification of front group $G_{23}(F)$ of third lens group $G_{23}$ in infinity focus state, at telephoto edge)
$r_1=222.2214$
    $d_1=2.0000$ $nd_1=1.91082$ $\upsilon d_1=35.25$
$r_2=103.4753$
    $d_2=10.5000$ $nd_2=1.45860$ $\upsilon d_2=90.19$
$r_3=-298.5174$
    $d_3=0.2000$
$r_4=88.2603$
    $d_4=8.8000$ $nd_3=1.49700$ $\upsilon d_3=81.61$
$r_5=-10563.5431$
    $d_5=1.2000$ (wide angle edge) to 31.5776 (intermediate position) to 53.9008 (telephoto edge)
$r_6=1009.5052$
    $d_6=5.2000$ $nd_4=1.90366$ $\upsilon d_4=31.31$
$r_7=-70.2509$
    $d_7=1.3500$ $nd_5=1.61800$ $\upsilon d_5=63.39$
$r_8=70.2509$
    $d_8=3.7528$
$r_9=-156.3665$
    $d_9=1.2000$ $nd_6=1.49700$ $\upsilon d_6=81.61$
$r_{10}=49.6801$
    $d_{10}=3.3000$ $nd_7=1.84666$ $\upsilon d_7=23.78$
$r_{11}=95.2516$
    $d_{11}=4.6178$
$r_{12}=-58.7772$
    $d_{12}=1.2000$ $nd_8=1.88300$ $\upsilon d_8=40.80$
$r_{13}=177.1970$
    $d_{13}=15.1042$ (wide angle edge) to 11.3976 (intermediate position) to 1.6000 (telephoto edge)

$r_{14}$=102.9577 (aspheric surface) (effective diameter φS=37.0)
    $d_{14}$=6.7500 $nd_9$=1.51633 $\upsilon d_9$=64.06
$r_{15}$=−59.5060 (aspheric surface)
    $d_{15}$=13.4571
$r_{16}$=−137.5555
    $d_{16}$=1.4000 $nd_{10}$=1.92286 $\upsilon d_{10}$=20.88
$r_{17}$=−252.3951
    $d_{17}$=40.6970 (wide angle edge) to 14.0261 (intermediate position) to 1.5000 (telephoto edge)
$r_{18}$=113.0406
    $d_{18}$=5.2838 $nd_{11}$=1.61800 $\upsilon d_{11}$=63.39
$r_{19}$=−98.7983
    $d_{19}$=1.7000
$r_{20}$=∞ (aperture stop)
    $d_{20}$=1.7000
$r_{21}$=36.3568
    $d_{21}$=9.5000 $nd_{12}$=1.49700 $\upsilon d_{12}$=81.61
$r_{22}$=−67.3140
    $d_{22}$=3.0000 $nd_{13}$=1.71736 $\upsilon d_{13}$=29.50
$r_{23}$=96.8404
    $d_{23}$=13.5679
$r_{24}$=−91.3000
    $d_{24}$=2.3000 $nd_{14}$=1.80809 $\upsilon d_{14}$=22.76
$r_{25}$=−39.7728
    $d_{25}$=1.4300 $nd_{15}$=1.69350 $\upsilon d_{15}$=53.20
$r_{26}$=41.0718 (aspheric surface)
    $d_{26}$=10.0244
$r_{27}$=75.9182
    $d_{27}$=8.0000 $nd_{16}$=1.61800 $\upsilon d_{16}$=63.39
$r_{28}$=−45.6371
    $d_{23}$=12.1798
$r_{29}$=−27.5459
    $d_{29}$=1.5000 $nd_{17}$=1.71300 $\upsilon d_{17}$=53.94
$r_{30}$=−65.7082
    $d_{30}$=3.8260
$r_{31}$=127.8003
    $d_{31}$=5.5000 $nd_{18}$=1.56883 $\upsilon d_{18}$=56.04
$r_{32}$=−96.1226
    $d_{32}$=48.305
$r_{33}$=∞ (imaging plane)
Constant of Cone (K) and Aspheric Coefficients (A, B, C, D, E, F)
(Fourteenth Plane)
K=−5.6100,
A=0, B=−6.34506×10$^{-9}$,
C=−2.39141×10$^{-9}$, D=1.90231×10$^{-11}$,
E=−4.99934×10$^{-14}$, F=4.49558×10$^{-17}$
(Fifteenth Plane)
K=−0.6649,
A=0, B=2.19580×10$^{-7}$,
C=−3.02130×10$^{-9}$, D=2.14493×10$^{-11}$,
E=−5.34576×10$^{-14}$, F=4.66441×10$^{-17}$
(Twenty-Sixth Plane)
K=−1.3886,
A=0, B=−1.07914×10$^{-6}$,
C=−2.70333×10$^{-9}$, D=4.27338×10$^{-12}$,
E=−7.70848×10$^{-15}$, F=0

Figure 6:
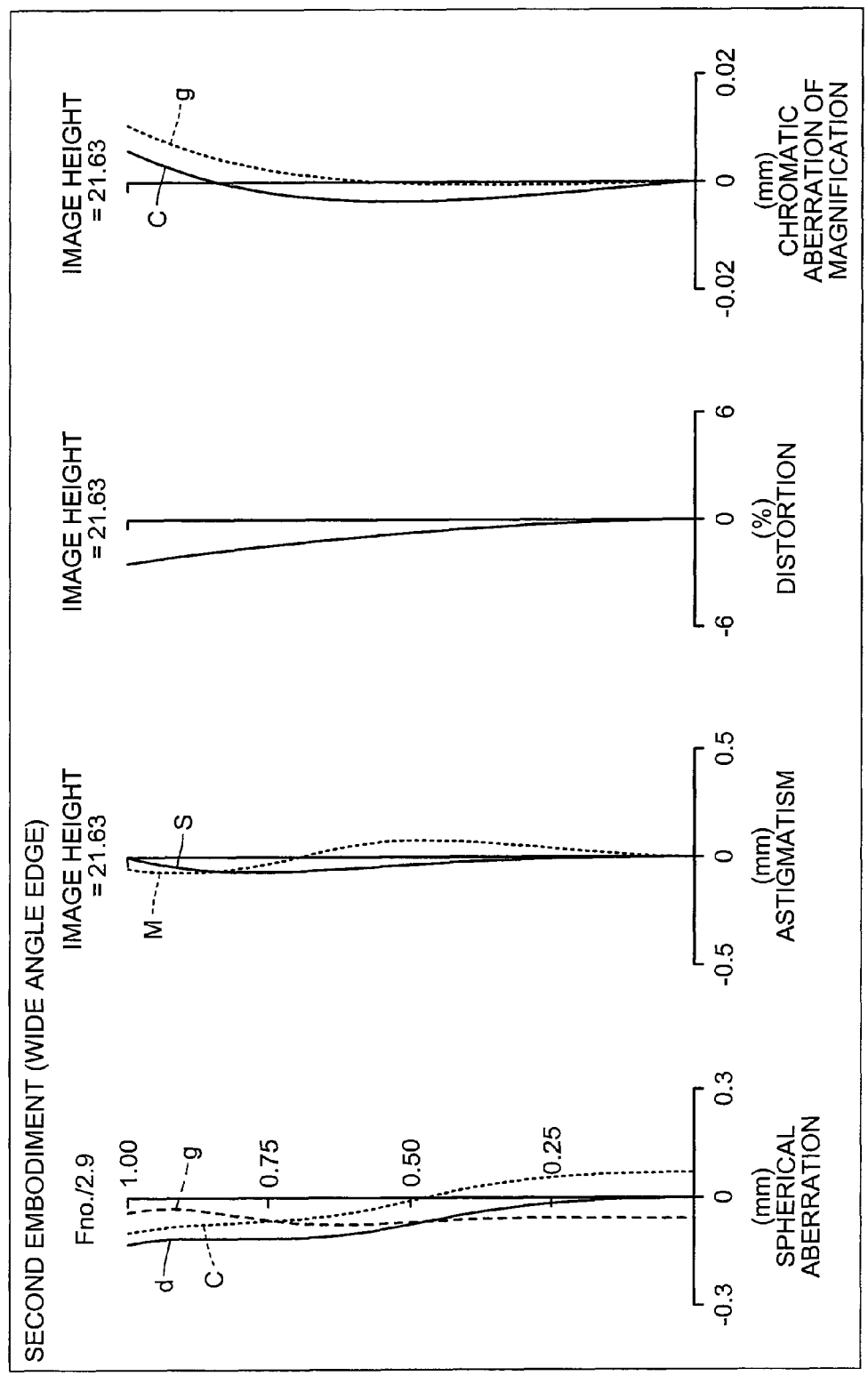
FIG. 6 is a diagram of various types of aberration at the wide angle edge of the zoom lens of the second embodiment according to the invention.
Figure 7:
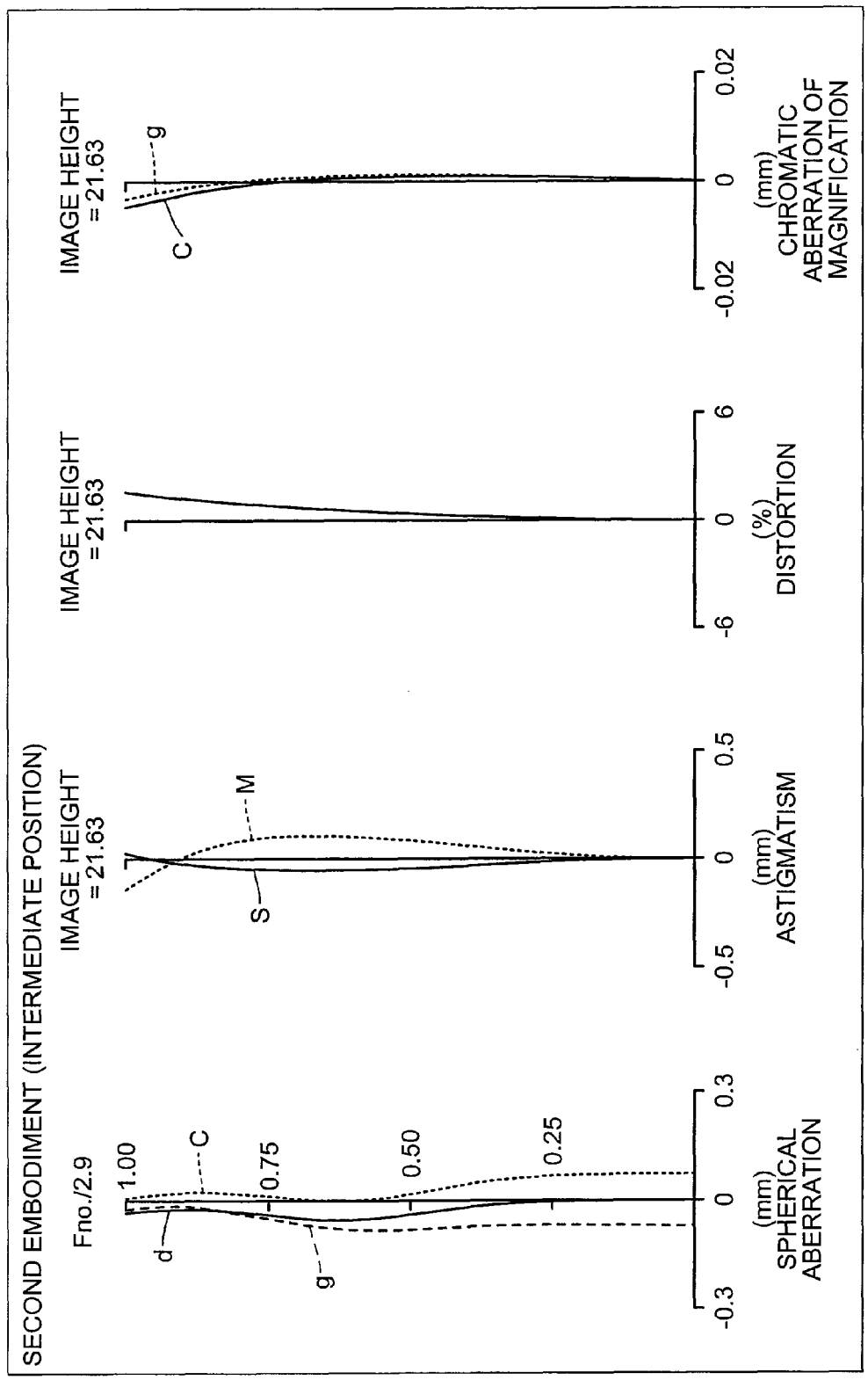
FIG. 7 is a diagram of various types of aberration at the intermediate position of the zoom lens of the second embodiment according to the invention.
Figure 8:
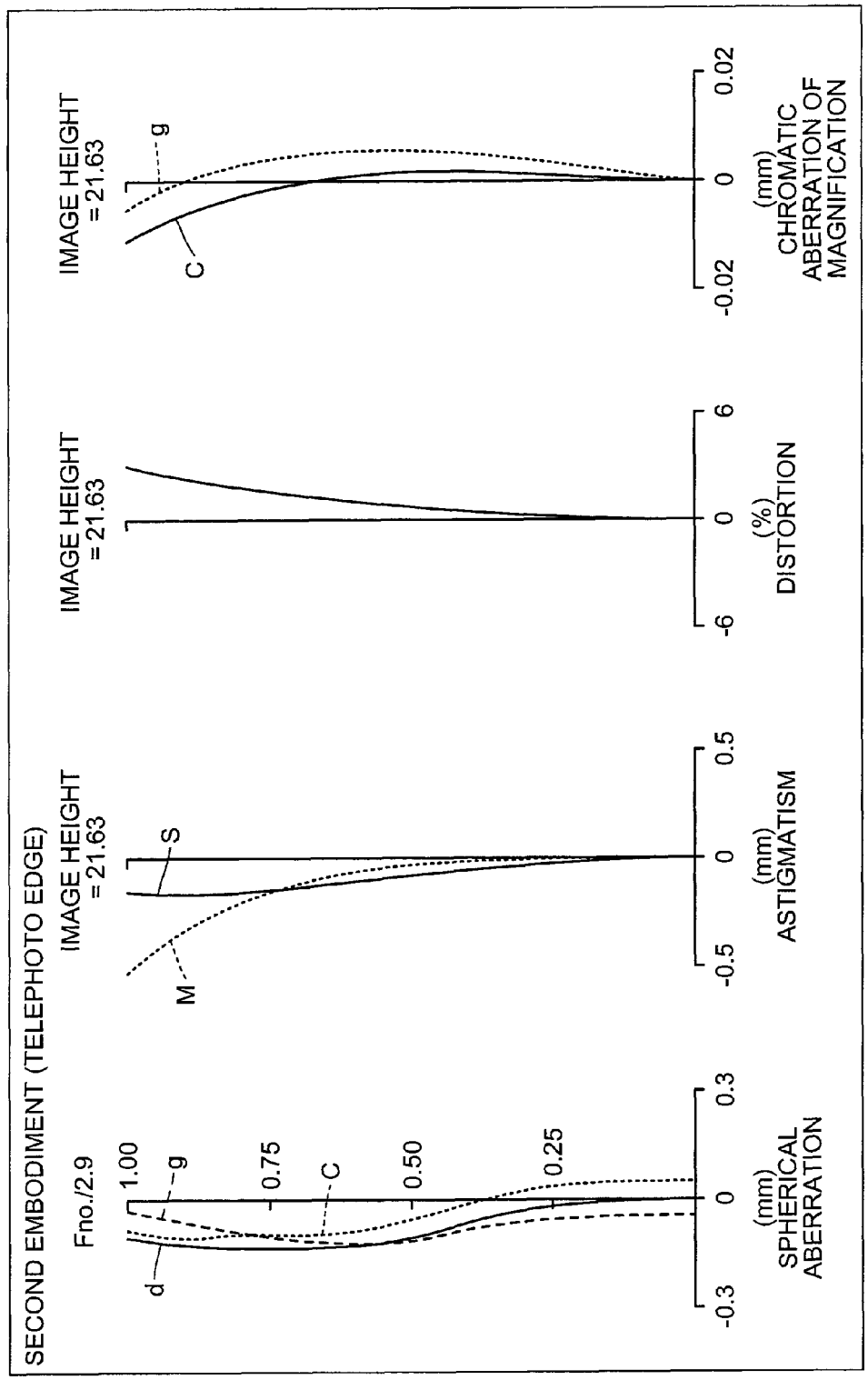
FIG. 8 is a diagram of various types of aberration at the telephoto edge of the zoom lens of the second embodiment according to the invention.

FIG. 6 is a diagram of various types of aberration at the wide angle edge of the zoom lens of the second embodiment according to the invention; FIG. 7 is a diagram of various types of aberration at the intermediate position of the zoom lens of the second embodiment according to the invention; and FIG. 8 is a diagram of various types of aberration at the telephoto edge of the zoom lens of the second embodiment according to the invention. In the diagrams, g, d, and C represent wavelength aberration corresponding to the g-line (λ=435.83 nm), the d-line (λ=587.56 nm), and the c-line (λ=656.27 nm), respectively; and ΔS and ΔM in a portion depicting astigmatism, indicate aberration with respect to a sagittal image plane and a meridional image plane, respectively.

Among the values for each of the embodiments above, $r_2, \ldots$ indicate radii of curvature for each lens, diaphragm surface, etc.; $d_1, d_2, \ldots$ indicate the thickness of the lenses, diaphragm, etc. or the distance between surfaces thereof; $nd_1, nd_2, \ldots$ indicate the refraction index of each lens with respect to the d-line (λ=587.56 nm); and $\upsilon d_1, \upsilon d_2, \ldots$ indicate the Abbe number with respect to the d-line (λ=587.56 nm) of each lens.

Each of the aspheric surfaces above can be expressed by equation [1], where Z is aspheric surface depth, y is the height from the optical axis, and the travel direction of light is positive.

$$Z = \frac{y^2}{R\left(1 + \sqrt{1 - (1+K)y^2/R^2}\right)} + Ay^2 + By^4 + Cy^6 + Dy^8 + Ey^{10} + Fy^{12} \quad [1]$$

Where, R is the paraxial radius of curvature; K is the constant of the cone; and A, B, C, D, E, F are the second, fourth, sixth, eighth, tenth, and twelfth aspheric coefficients, respectively.

In each of the embodiments, the invention is applied and examples configuring a large diameter, internal focusing telephoto zoom lens having at the wide angle edge, a focal length of 72 mm or less, a zoom ratio of 2.7× or more and a F number of 3 or less. As shown in these embodiments, by satisfying each of the conditions above, reductions in the size and weight of the focusing group and suppression of the distance that the focusing group is extended for focusing become possible, enabling focusing to be performed quickly. As a result, a zoom lens capable of quickly capturing images can be provided. Furthermore, suppression of the distance that the focusing group is extended for focusing promotes reductions in the overall length of the optical system and there is no deterioration of optical performance. Moreover, the zoom lens of the embodiments employs a lens having a suitable aspheric surface, whereby favorable optical performance can be maintained with fewer lenses.

According to the present invention, both the suppression of the distance that the focusing group is extended to perform focusing (displacement) and favorable correction of various types of aberration can be achieved. As a result, a compact, high performance zoom lens can be provided.

Further, the present invention effects a zoom lens that has high optical performance and is capable of quickly capturing images by achieving a compact, light weight focusing group and suppressing the distance that the focusing group is moved for focusing.

As described, the zoom lens of the present invention is useful in imaging apparatuses such as DSMCs and single-less reflex cameras, and is particularly ideal when a quick capturing of images is demanded.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2010-203702 filed in Japan on Sep. 10, 2010.

What is claimed is:

1. A zoom lens comprising sequentially from an object side:
   a first lens group having a positive refractive power;
   a second lens group having negative refractive power;
   a third lens group having a positive refractive power; and
   a fourth lens group having a positive refractive power,
   wherein the third lens group includes, sequentially from the object side, a front group having a positive refractive power and a rear group having a negative refractive power,
   wherein zoom is performed by moving the second lens group and the third lens group in a direction along an optical axis, and by integrally moving the front group and the rear group in a direction along the optical axis, and
   focusing is performed by moving the front group in a direction along the optical axis,
   wherein the front group of the third lens group is configured by only one positive lens.

2. The zoom lens according to claim 1, wherein the front group of the third lens group is configured by an aspheric lens that satisfies conditional expression $0.1<|100\times(\Delta S1-\Delta S2)/\phi S|<0.5$, where $\Delta S1$ represents deviation of a paraxial radius of curvature at a height of an effective diameter of an aspheric surface on the object side of the front group and aspheric surface shape, $\Delta S2$ represents deviation of the paraxial radius of curvature at a height of an effective diameter of an aspheric surface on an image side of the front group and aspheric shape, and $\phi S$ represents the effective diameter of the front group.

3. The zoom lens according to claim 1, wherein conditional expression $0.5<F3F/F3<0.95$ is satisfied, where F3F is a focal length of the front group of the third lens group and F3 is a focal length of the entire third lens group in an infinity focus state.

4. The zoom lens according to claim 1, wherein conditional expression $5<|\beta FT|$ is satisfied, where $\beta FT$ is lateral magnification of the front group of the third lens group in an infinity focus state at a telephoto edge.

5. A zoom lens comprising sequentially from an object side:
   a first lens group having a positive refractive power;
   a second lens group having negative refractive power;
   a third lens group having a positive refractive power; and
   a fourth lens group having a positive refractive power,
   wherein the third lens group includes, sequentially from the object side, a front group having a positive refractive power and a rear group having a negative refractive power,
   wherein zoom is performed by moving the second lens group and the third lens group in a direction along an optical axis, and by integrally moving the front group and the rear group in a direction along the optical axis, and
   focusing is performed by moving the front group in a direction along the optical axis,
   wherein conditional expression $5<|\beta FT|$ is satisfied, where $\beta FT$ is lateral magnification of the front group of the third lens group in an infinity focus state at a telephoto edge.

6. The zoom lens according to claim 5, wherein the front group of the third lens group is configured by one positive lens.

7. The zoom lens according to claim 5, wherein the front group of the third lens group is configured by an aspheric lens that satisfies conditional expression $0.1<|100\times(\Delta S1-\Delta S2)/\phi S|<0.5$, where $\Delta S1$ represents deviation of a paraxial radius of curvature at a height of an effective diameter of an aspheric surface on the object side of the front group and aspheric surface shape, $\Delta S2$ represents deviation of the paraxial radius of curvature at a height of an effective diameter of an aspheric surface on an image side of the front group and aspheric shape, and $\phi S$ represents the effective diameter of the front group.

8. The zoom lens according to claim 5, wherein conditional expression $0.5<F3F/F3<0.95$ is satisfied, where F3F is a focal length of the front group of the third lens group and F3 is a focal length of the entire third lens group in an infinity focus state.

9. A zoom lens comprising sequentially from an object side:
   a first lens group having a positive refractive power;
   a second lens group having negative refractive power;
   a third lens group having a positive refractive power; and
   a fourth lens group having a positive refractive power,
   wherein the third lens group includes, sequentially from the object side, a front group having a positive refractive power and a rear group having a negative refractive power,
   wherein zoom is performed by moving the second lens group and the third lens group in a direction along an optical axis, and by integrally moving the front group and the rear group in a direction along the optical axis, and
   focusing is performed by moving the front group in a direction along the optical axis,
   wherein the first lens group and the fourth lens group are fixed.

10. The zoom lens according to claim 9, wherein the front group of the third lens group is configured by only one positive lens.

11. The zoom lens according to claim 9, wherein the front group of the third lens group is configured by an aspheric lens that satisfies conditional expression $0.1<|100\times(\Delta S1-\Delta S2)/\phi S|<0.5$, where $\Delta S1$ represents deviation of a paraxial radius of curvature at a height of an effective diameter of an aspheric surface on the object side of the front group and aspheric surface shape, $\Delta S2$ represents deviation of the paraxial radius of curvature at a height of an effective diameter of an aspheric surface on an image side of the front group and aspheric shape, and $\phi S$ represents the effective diameter of the front group.

12. The zoom lens according to claim 9, wherein conditional expression $0.5<F3F/F3<0.95$ is satisfied, where F3F is a focal length of the front group of the third lens group and F3 is a focal length of the entire third lens group in an infinity focus state.

13. The zoom lens according to claim 9, wherein conditional expression $5<|\beta FT|$ is satisfied, where $\beta FT$ is lateral magnification of the front group of the third lens group in an infinity focus state at a telephoto edge.

* * * * *